United States Patent
Gnagey et al.

(10) Patent No.: US 11,891,278 B1
(45) Date of Patent: Feb. 6, 2024

(54) LIFTING CAPACITY SYSTEMS AND METHODS FOR LIFTING MACHINES

(71) Applicant: Caterpillar Inc., Peoria, IL (US)

(72) Inventors: Aaron J. Gnagey, Morton, IL (US); Daniel W. Hoyt, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/899,848

(22) Filed: Aug. 31, 2022

(51) Int. Cl.
| | |
|---|---|
| *B66C 13/16* | (2006.01) |
| *F16L 1/06* | (2006.01) |
| *B66C 23/44* | (2006.01) |
| *B66C 23/90* | (2006.01) |
| *F16L 1/036* | (2006.01) |
| *G08B 21/18* | (2006.01) |

(52) U.S. Cl.
CPC .............. *B66C 13/16* (2013.01); *B66C 23/44* (2013.01); *B66C 23/905* (2013.01); *F16L 1/036* (2013.01); *F16L 1/065* (2013.01); *G08B 21/18* (2013.01)

(58) Field of Classification Search
CPC ....... B66C 23/905; B66C 13/16; B66C 23/44; F16L 1/036; F16L 1/065
See application file for complete search history.

(56) References Cited

U.S. PATENT DOCUMENTS

| | | | |
|---|---|---|---|
| 7,121,355 B2 | 10/2006 | Lumpkins et al. | |
| 8,406,963 B2 | 3/2013 | Farmer et al. | |
| 8,738,242 B2 | 5/2014 | Konno et al. | |
| 9,222,237 B1 | 12/2015 | Green et al. | |
| 9,238,479 B2 | 1/2016 | Smith et al. | |
| 9,551,130 B2 | 1/2017 | Hendron et al. | |
| 9,580,104 B2 | 2/2017 | Green et al. | |
| 10,782,202 B2 | 9/2020 | Bonnet et al. | |
| 11,511,976 B2* | 11/2022 | Caldwell | B66C 23/76 |
| 2012/0241402 A1* | 9/2012 | Ward | A61K 47/12 |
| | | | 212/196 |
| 2015/0361640 A1 | 12/2015 | Faivre et al. | |
| 2016/0169413 A1* | 6/2016 | Camacho | F16L 1/06 |
| | | | 414/745.6 |
| 2016/0230367 A1 | 8/2016 | Hendron et al. | |
| 2019/0033158 A1 | 1/2019 | Bonnet et al. | |
| 2021/0094803 A1 | 4/2021 | Caldwell et al. | |
| 2021/0101788 A1 | 4/2021 | Caldwell et al. | |
| 2021/0179396 A1 | 6/2021 | Schoonmaker et al. | |
| 2022/0315394 A1* | 10/2022 | Jackson | B66C 23/76 |

\* cited by examiner

*Primary Examiner* — Michael R Mansen
*Assistant Examiner* — Juan J Campos, Jr.
(74) *Attorney, Agent, or Firm* — Bookoff McAndrews, PLLC (57) ABSTRACT

A lifting machine includes a machine chassis, a boom extending from the machine chassis, a connector extending from the boom for coupling to a load, a control system that determines a rated lifting capacity of the machine, based on an orientation of the machine chassis and a lifting load, and a display. The display indicates the rated lifting capacity relative to a total lifting capacity, and the display also indicates the lifting load relative to the rated lifting capacity and the total lifting capacity.

20 Claims, 5 Drawing Sheets

LIFTING CAPACITY SYSTEMS AND METHODS FOR LIFTING MACHINES

TECHNICAL FIELD

The present disclosure relates generally to lifting machines, and more particularly to lifting capacity systems and methods for such machines.

BACKGROUND

Lifting machines, such as mobile pipelayer machines are used for lifting and moving large objects into or above the ground. Such objects can include heavy lengths of conduit for pipelines. The installation of such conduits can be challenging. The desired locations of such pipelines can be some of the most remote areas on earth, and the terrain over which the pipeline must traverse is often some of the most rugged. The land may have significant changes in elevation and varying types of ground. In order to install the conduit, the pipelayer machine must be able to traverse such terrain and be able to lift and accurately place loads, which are often in excess of 200,000 pounds.

When installing the conduit, the pipelayer machine uses a boom on the side of the machine that can be controllably extended away from the machine over a range of angles with respect to the chassis of the machine. One or more cables may extend from a winch or other power source through a series of sheaves or pulleys and terminate in a grapple hook or other suitable connector or terminus of the boom. The grapple hook can then be secured to the pipe in such a way that when the winch recoils, the pipe is lifted. The pipelayer machine is then navigated to a desired location and the boom is lowered to a desired location for accurate installation of the pipe, such as into a trench.

During operation, the pipelayer machine positions the weight of the conduit in a cantilevered fashion away from the chassis, engine, and undercarriage of the pipelayer machine. As the chassis, engine, and undercarriage comprise the majority of the weight of the pipelayer machine, depending on the weight of the pipe being lifted and the length of the boom arm, the pipelayer machine can be subject to potential tipping and instability. Conversely, if the pipelayer machine is operated too conservatively to avoid the full capability of the machine, the ability of the pipelayer machine to access the desired installation location can be significantly limited.

In addition, current demands being placed on pipelayer machines require higher lifting capacities and boom lengths/angles. The pipelayer machine could in theory simply be made larger and heavier to satisfy these needs, but realistically the general footprint of the pipelayer machine is limited by cost, maneuverability, and transportation considerations. As stated above, pipelayer machines need to be operated in very remote and difficult locations. Pipelayer machines also have to be nimble enough to perform the job. Moreover, over-sizing the undercarriage and boom of the pipelayer machine will also increase manufacturing costs (i.e., in terms of materials) and/or operating costs (i.e., in terms of fuel, maintenance, etc.)

U.S. Patent Application Publication No. 2019/0033158 A1 to Bonnet et. al. ("the '158 publication") discloses a load moment indicator system and method for a pipelayer machine. The system of the '158 publication uses a sensor array for determining the tipping stability of the pipelayer machine in real-time. The sensor array uses sensors that are all provided on the main body of the pipelayer machine. In particular, the sensor array may include a load pin, a luff accelerometer, a boom winch encoder, a vehicle accelerometer, and a hook winch encoder. Although the '158 publication discloses a system that determines the tipping stability of a pipelayer machine in real-time, the system does not take into account all of the factors relevant to tipping stability, and does not display a current hook load and/or a load capacity in a current orientation of the machine, for example, relative to a maximum load capacity. In view of this, there is a need for pipelayer machines to include lifting capacity systems that accurately determine and display the maximum load that the pipelayer machine can accommodate in a current orientation without tipping, along with the current hook load being lifted.

The lifting capacity system and method of the present disclosure may solve one or more of the problems set forth above and/or other problems in the art. The scope of the current disclosure, however, is defined by the attached claims, and not by the ability to solve any specific problem.

SUMMARY

In one aspect, a lifting machine may include a machine chassis, a boom extending from the machine chassis, a connector extending from the boom for coupling to a load, a control system that determines a rated lifting capacity of the machine, based on an orientation of the machine chassis and a lifting load, and a display. The display may indicate the rated lifting capacity relative to a total lifting capacity, and the display also may indicate the lifting load relative to the rated lifting capacity and the total lifting capacity.

In another aspect, a method may include determining a lifting capacity of a lifting machine. The lifting machine may include a chassis, a boom extending from the chassis, and a connector extending from the boom for coupling to a load. The method may include sensing information including one or more of: a boom overhang distance, and an orientation of the chassis. The method may also include measuring a real-time load on the boom and/or on the connector, and displaying a rated lifting capacity and a lifting load on a display. The rated capacity may be based on the sensed information. The lifting load may be based on the measured real-time load on the boom and/or on the connector.

In yet another aspect, a mobile pipelayer machine may include a machine chassis, a boom extending from the machine chassis, a connector extending from the boom for coupling to a load, a control system that determines a rated lifting capacity of the machine and a lifting load, wherein the control system determines the rated lifting capacity based on an a fore, aft, and roll orientation of the machine chassis, and a display. The display may indicate the rated lifting capacity relative to a total lifting capacity, the lifting load relative to the rated lifting capacity and the total lifting capacity, a numeric value of a current chassis pitch, and a numeric value of a current chassis roll.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," and "approximately" are used to indicate a possible variation of ±10% in the stated value.

Figure 1:
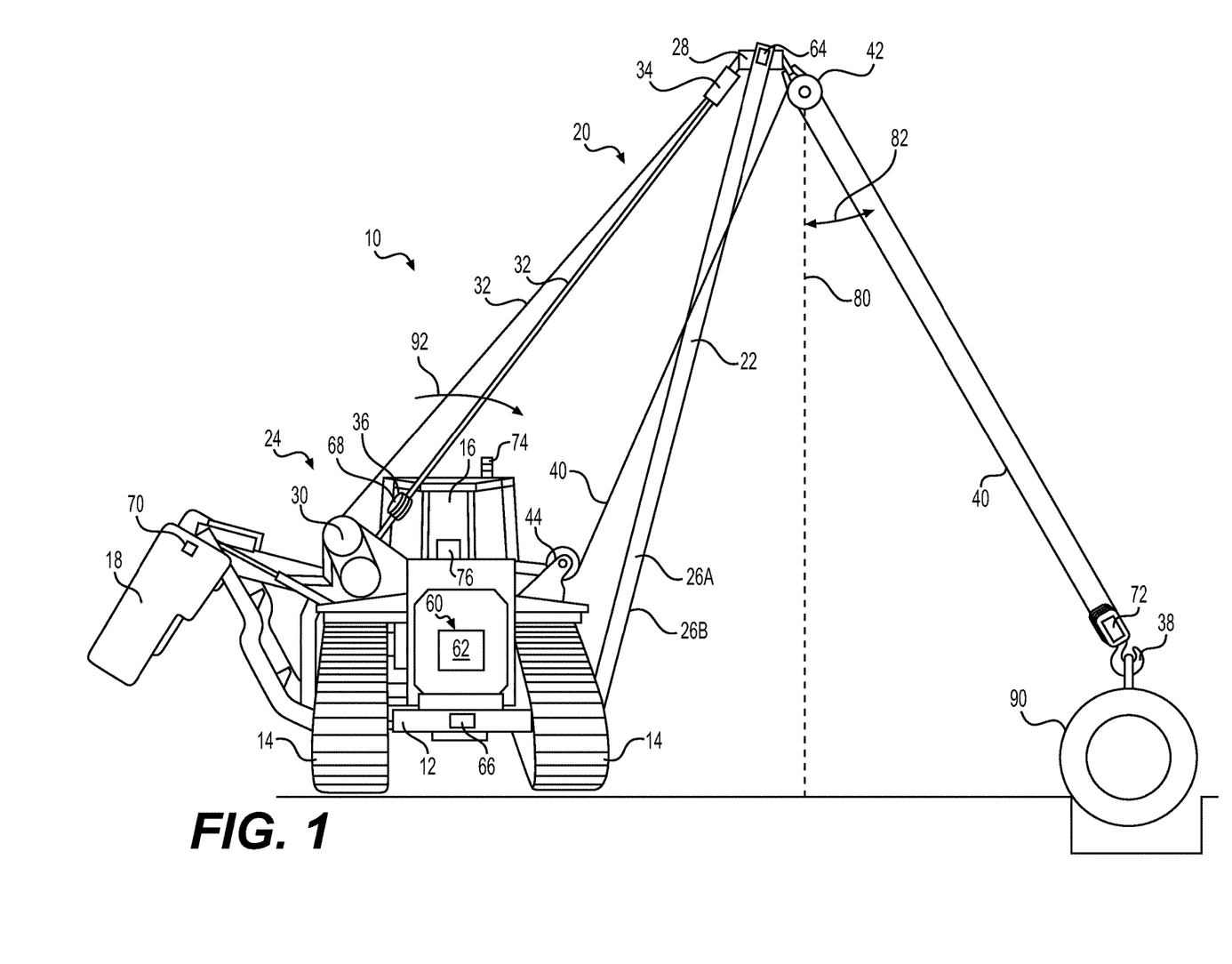
FIG. 1 shows a front view of an exemplary lifting machine having a crane assembly, in accordance with the present disclosure.

FIG. 1 illustrates a lifting machine 10 having a crane assembly 20. Throughout this disclosure, lifting machine 10 will be described with reference to a mobile pipelayer machine 10, however it is understood that machine 10 may be any type of lifting machine having a crane assembly 20. Pipelayer machine 10 may include a chassis 12, a pair of drive tracks 14, an operator cab 16, a movable counterweight 18, and a power source, such as an internal combustion engine (not shown). As will be described in more detail below, pipelayer machine 10 may also include a control system 60, including a controller 62 coupled to one or more of a plurality of sensors 64, 66, 68, 70, and 72, an indicator 74, and a display 76. Display 76 may be located in operator cab 16, as shown in FIG. 1, or may be remote from operator cab 16, for example, remote from pipelayer machine 10.

Figure 2:
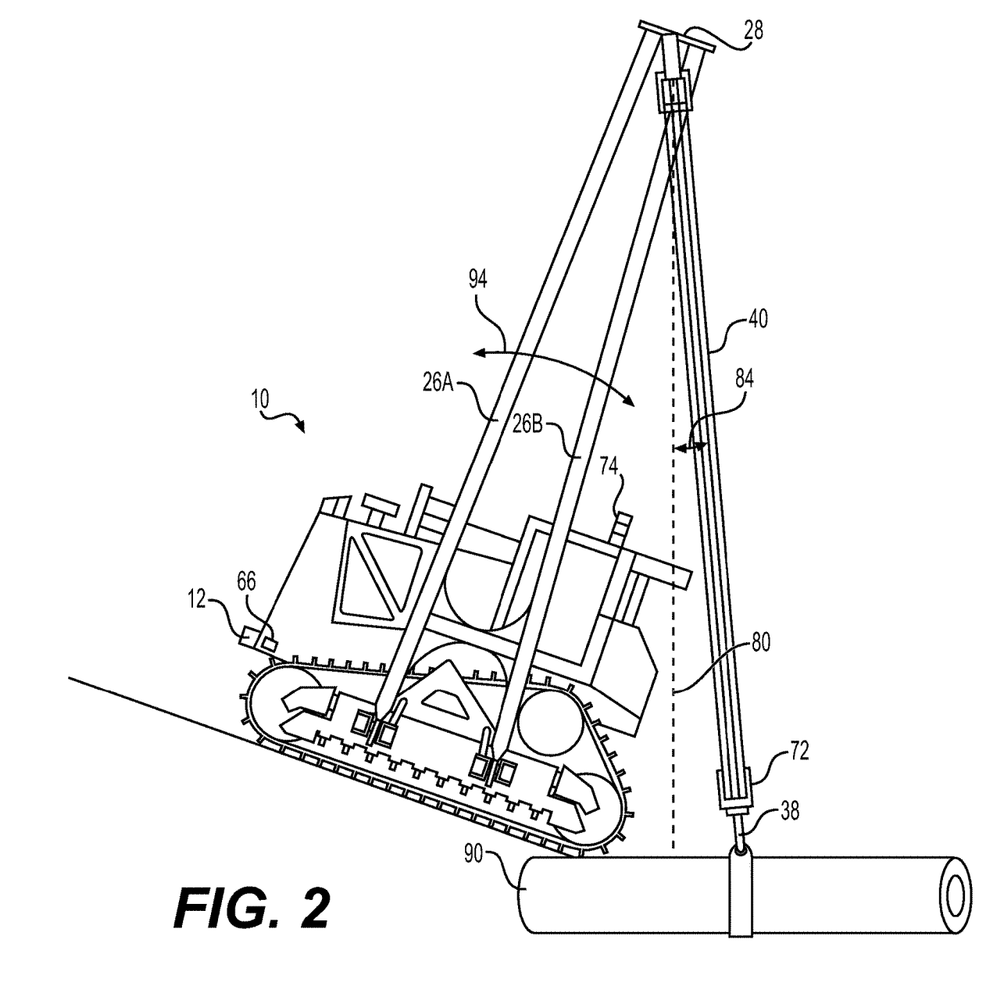
FIG. 2 shows a side view of the lifting machine of FIG. 1.

As shown in FIGS. 1 and 2, crane assembly 20 may include a boom 22, and a winch system 24. Boom 22 may include first and second legs 26A, 26B (FIG. 2), which may be independently hinged to chassis 12 at one end, and extending to a joined boom tip 28. Winch system 24 may include winch 30 and a first set of lifting cables 32 extending from winch 30 through a series of pulleys or sheaves 34, 36. Crane assembly 20 may further include a grapple hook 38 or other terminating connector coupled to the boom tip 28 through a second set of lifting cables 40, pulleys or sheaves 42, 44, and winch 30.

Figure 3:
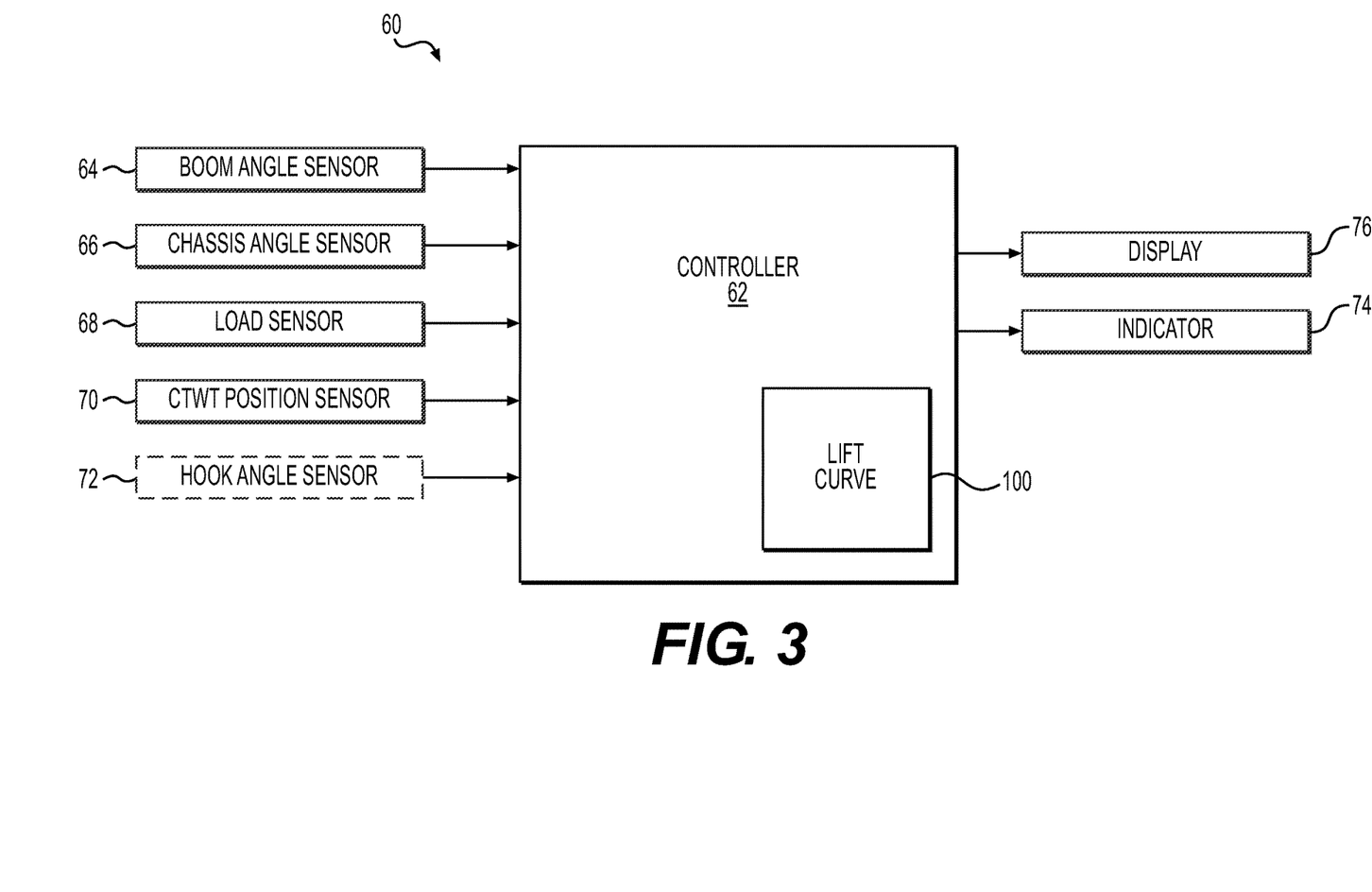
FIG. 3 shows an exemplary control system of the lifting machine of FIG. 1.

With reference to FIGS. 1 and 3, control system 60 may include controller 62. Controller 62 may include any appropriate hardware, software, firmware, etc. to carry out the methods described in this disclosure, including the method of FIG. 5. Controller 62 may include one or more processors, memory, a secondary storage device, communication systems, and/or other appropriate hardware. The processors may be, for example, a single or multi-core processor, a digital signal processor, microcontroller, a general purpose central processing unit (CPU), and/or other conventional processor or processing/controlling circuit or controller. The processors may embody microprocessors, for example, a single microprocessor or multiple microprocessors. The memory or secondary storage device associated with controller 62 may be non-transitory computer-readable media that store data and/or software routines that may assist controller 62 in performing its functions. In these aspects, the memory or secondary storage device may include, for example, read-only memory (ROM), random access memory (RAM), flash or other removable memory, or any other appropriate and conventional memory. Further, the memory or secondary storage device associated with controller 62 may also store data received from the various inputs or sensors associated with machine 10. Numerous commercially available microprocessors can be configured to perform the functions of controller 62. It should be appreciated that controller 26 could readily embody a general machine controller capable of controlling numerous other machine functions. Various other known circuits may be associated with controller 62, including signal-conditioning circuitry, communication circuitry, hydraulic or other actuation circuitry, and other appropriate circuitry.

The communication systems used in the components of control system 60 may include, for example, any conventional wired and/or wireless communication systems such as Ethernet, Bluetooth, and/or wireless local area network (WLAN) type systems. The communication system of controller 62 may include communication to and from, for example, one or more of sensors 64-72, indicator 74, and display 76. Further, controller 62 may have stored therein a lift curve 100, which may include one or more graphs that identify the relationship of a tipping load or a maximum load capacity to the sensed information from one or more of sensors 64-72.

Sensors 64-72 may be sensors arranged to provide controller 62 with data regarding the lifting capacity of pipelayer machine 10. For example, sensor 64 may be a boom angle sensor to provide data corresponding to an angle of boom 22 with respect to chassis 12. Boom angle sensor 64 may be used by control system 60 to determine, or as a value indicative of, the distance of overhang of boom 22 away from chassis 12 of pipelayer machine 10. Boom angle sensor 64 may be located at boom tip 28, or at other appropriate positions on pipelayer machine 10. Sensor 66 may be a chassis angle sensor providing data corresponding to an orientation of chassis 12, for example, the fore or aft pitch 94 (FIG. 2) and/or roll 92 (FIG. 1) of pipelayer machine 10. Chassis angle sensor 66 may be located on chassis 12, or at other appropriate positions on pipelayer machine 10. Sensor 68 may be a load sensor providing data regarding the load connected to grapple hook 38. Load sensor 68 may be located at pulley or sheave 36 of winch system 24, or at other appropriate positions on pipelayer machine 10. Sensor 70 may be a counterweight position sensor providing data indicative of the location or extension of counterweight 18. Counterweight position sensor 70 may be located on counterweight 18, or at other appropriate positions on pipelayer machine 10.

Sensor 72 may be a hook position sensor providing data regarding the angular location of the grapple hook 38. For example, hook angle sensor 72 may provide an angular position of grapple hook 38 with respect to a vertical reference line or "plum line" position 80 of grapple hook 38. The vertical reference line or plum line position 80 of grapple hook 38 may correspond to a position of grapple hook 38 and associated lifting cables 40 extending from pulley or sheave 42 extending vertically along the force of gravity, for example, as shown in FIGS. 1 and 2. As shown in FIG. 1, grapple hook 38 may be skewed in the roll direction by an angle 82 extending away from a side of pipelayer machine 10, or skewed in a pitch direction at an angle 84 shown in FIG. 2 extending fore or aft with respect to plum line position 80. In this aspect, the skew of grapple hook 38 (or other terminating connector coupled to the boom tip 28) may be caused by the load (i.e., from pipe 90). Hook angle sensor 72 may be located on grapple hook 38, or at other appropriate positions on pipelayer machine 10.

Additionally, as shown in FIG. 3, hook angle sensor 72 may be optional in control system 60 and pipelayer machine 10.

Figure 4:
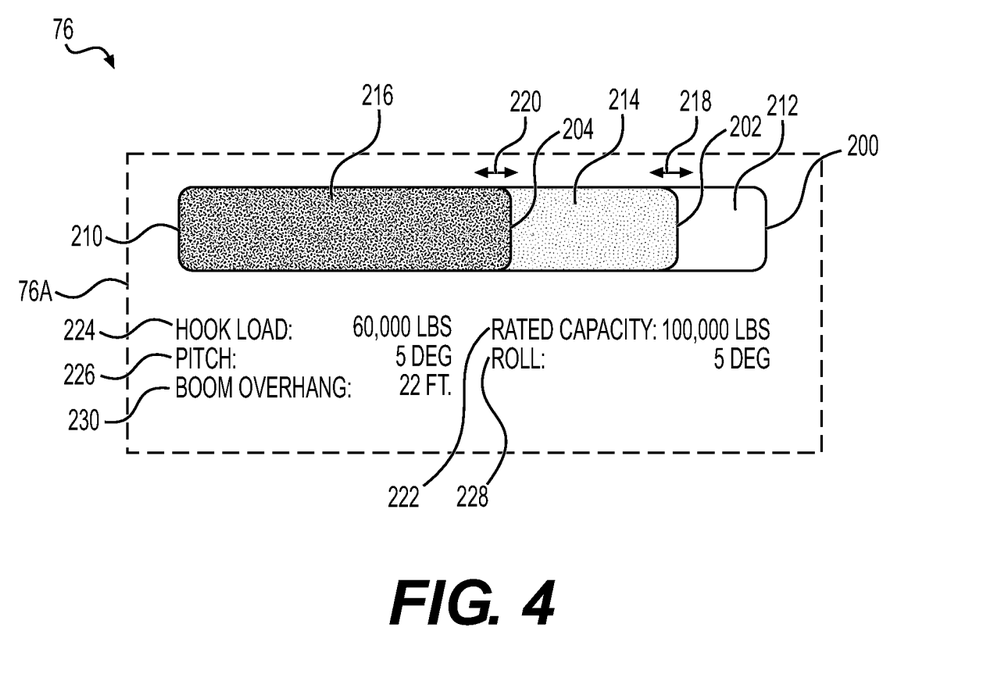
FIG. 4 shows an exemplary display that is a part of the control system of FIG. 3.

One or more of sensors 64-72 may form a sensing system and may include any standard type of sensor, such as an inertial measurement unit (IMU), an angle sensor, a load sensor or a load cell sensor (e.g., a load pin type sensor), a camera-based sensor, or any other appropriate type of sensor to provide the required data. In some aspects, one or more of sensors 64-72 may be used, for example, by controller 62, to determine (i.e., calculate) a rated capacity of pipelayer machine 10, for example, based on the current orientation of pipelayer machine 10 and/or the position of one or more portions or components of pipelayer machine 10. In these aspects, the rated capacity may be less than a highest possible rated capacity for pipelayer machine 10 (i.e., when pipelayer machine 10 is on flat ground, when boom tip 28 is above and/or closer to chassis 12 at a smaller boom angles 82, 84, when counterweight 18 is fully extended, etc.). For example, a more extreme position or orientation of boom tip 28, e.g., as sensed by boom angle sensor 64, may reduce the rated capacity of pipelayer machine 10. Additionally or alternatively, a more extreme chassis position (i.e., pitch or roll relative to a flat orientation), e.g., as sensed by chassis angle sensor 66, may reduce the rated capacity of pipelayer machine 10. In some aspects, a more extreme position or orientation of counterweight 18, e.g., as sensed by counterweight position sensor 70, may reduce the rated capacity of pipelayer machine 10. In this aspect, when counterweight 18 is closer to chassis 12 and/or at a larger angle from horizontal, the rated capacity of pipelayer machine 10 may be reduced, while when counterweight 18 is farther from chassis 12 and/or closer to horizontal, the rated capacity of pipelayer machine 10 may be increase. As shown in FIG. 4 and as discussed below, the rated capacity, based on one or more of these aspects, may be displayed on display 76, for example, relative to the highest possible capacity. Additionally, a current load (i.e., from load sensor 68) may be displayed on display 76, for example, relative to the rated capacity and the highest possible capacity.

Moreover, as mentioned above, lift curve 100 may identify the relationship of the tipping load or the maximum load capacity to the sensed information from sensors 66-72. In these aspects, lift curve 100 may identify these relationships based on one or more of a boom overhang distance (via boom angle sensor 64), fore, aft, and roll angle (i.e., orientation) of chassis 12 (via chassis angle sensor 66), the load on the boom 22, for example, from pipe 90 (via load sensor 68), the extension of counterweight 18 (counterweight position sensor 70), and the skew or angular position of grapple hook 38 (via hook angle sensor 72). Furthermore, the identified tipping load or maximum load capacity may be correlated to a safe operating load, or a rated capacity. For example, the rated capacity may be a portion or percentage of the identified tipping load (i.e., a load that pipelayer machine 10 may lift safely without a risk of tipping). In these aspects, the rated capacity may be, for example, approximately 60%, 65%, 70%, 75%, 80%, 85%, 90%, 95%, etc. of the identified tipping load or maximum load capacity.

Furthermore, the rated capacity as a percentage of the identified tipping load or maximum load capacity may vary, for example, based on the boom overhang or other aspects of the orientation of pipelayer machine 10. In some aspects, the rated capacity and/or the identified tipping load or maximum load capacity may be indicated to the operator, for example, on display 76. For example, the rated capacity relative to the identified tipping load or maximum load capacity may be indicated to the operator, for example, on display 76.

Indicator 74 may be any type of indicator for proving information to an operator of pipelayer machine 10, or personnel located near pipelayer machine 10. For example, as shown in FIG. 1, indicator 74 may be a series of indicator lights that provide visual lifting capacity information, such as green, yellow, and red lights that provide a warning of a potential tipping of pipelayer machine based on approaching and/or exceeding the rated capacity, for example, approaching a lifting limit as determined by control system 60. While indicator 74 is shown as a visual indicator on the operator's cab, it is understood that the indicator could be alternatively or additionally be an audible indicator, and/or could be located at any appropriate location on pipelayer machine 10. Furthermore, in some aspects, indicator 74 may be remote from pipelayer machine 10. Although not shown, in some aspects, pipelayer machine 10 may include two or more indicators 74, for example, indicator 74 on pipelayer machine 10 (i.e., on operator cab 16) and one indicator 74 remote from pipelayer machine 10.

Referring to FIGS. 1, 3, and 4, display 76 may be any type of display, screen (e.g., a touch screen), information panel, etc. for receiving information from controller 62 and providing information to an operator or supervisor of pipelayer machine 10. Display 76 may be located in operator cab 16 (FIG. 1) and/or another location on pipelayer machine 10. Alternatively or additionally, display 76 may be located at a remote location. Furthermore, although not shown, pipelayer machine 10 may include two or more displays 76, for example, one display 76 on pipelayer machine 10 (i.e., in operator cab 16) and one display 76 remote from pipelayer machine 10.

As will be described in more detail below, display 76 may provide information relating to, for example, the lifting capacity of pipelayer machine 10 received from control system 60, for example, in a load display section 76A (FIG. 4). For example, in these aspects, display 76 indicates a total capacity 200 (i.e., a maximum lifting capacity) for pipelayer machine 10, for example, when pipelayer machine 10 is operating on flat ground and under ideal operating conditions. Stated another way, total capacity 200 for pipelayer machine 10 is a total or maximum lifting capacity that grapple hook 38 and the other components of crane assembly can lift without tipping when pipelayer machine 10 is operating on flat ground and under ideal operating conditions. In these aspects, the ideal operating conditions may include, as mentioned, flat ground such that chassis 12 is level. Additionally, the ideal operating conditions may include a minimum or zero boom overhang distance (e.g., as measured by boom angle sensor 64), counterweight 18 in a fully extended position (e.g., as measured by counterweight position sensor 70), a vertical orientation of grapple hook (i.e., no skew or angled positioning, as measured by hook angle sensor 72). Display 76 also indicates a rated capacity 202 for pipelayer machine 10, for example, which is a fraction, percentage, or otherwise a portion of total capacity 200. When pipelayer machine 10 is operating on flat ground and under ideal operating conditions, the rated capacity 202 may be equal to a designed lifting capacity of pipelayer machine 10, for example, a high percentage of the total capacity 200. As discussed above, when pipelayer machine 10 is operating on sloped ground or otherwise not under ideal operating conditions, the rated capacity 202 may be less than the designed lifting capacity of pipelayer machine 10, for example, a lower percentage of the total capacity 200. Additionally, display 76 may indicate a current lifting load or a current hook load 204, for example, as measured by load sensor 68. Additionally, although this disclosure mentions the load being hook load 204, this disclosure is not so limited, as display 76 may indicate any load lifted by a connector, for example, coupled to crane assembly 20.

In these aspects, total capacity 200, rated capacity 202, and current hook load 204 may be displayed on the same portion of display 76 (i.e., load display portion 76A). For example, as shown in FIG. 4, display 76 may include a display bar 210, for example, extending horizontally on a portion of display 76. The full length of display bar 210 may correspond to total capacity 200. Additionally, any portion of total capacity 200 that exceeds the current rated capacity 202 may be a first indication 212 (e.g., a first color, shade, cross-hatching, pattern, etc.). Display bar 210 may also display rated capacity 202, for example, relative to total capacity 200, and display bar 210 may also display current hook load 204, for example, relative to rated capacity 202 and total capacity 200. In these aspects, any portion of rated capacity that exceeds the current hook load 204 may be a second indication 214 (e.g., a second color, shade, cross-hatching, pattern, etc.). Moreover, the current hook load 204 may be indicated on display bar 210 (e.g., relative to rated capacity 202 and total capacity 200) as a third indication 216 (e.g., a third color, shade, cross-hatching, pattern, etc.). Moreover, the position of rated capacity 202 relative to total capacity 200 changes based on changes to the orientation and/or configuration of pipelayer machine 10, as indicated by arrows 218 (i.e., on a sliding scale relative to display bar 210, for example, relative to total capacity 200). Similarly, the position of hook load 204 on display bar 210 relative to rated capacity 202 and total capacity changes based on changes to the load on grapple hook 38, as indicated by arrows 220 (i.e., on a sliding scale relative to display bar 210, for example, relative to rated capacity 202 and total capacity 200). It is noted, however, that arrows 218, 220 may or may not be displayed on display 76.

Although not shown, display 76 may include one or more numerals, indications, demarcations, etc. adjacent to display bar 210. For example, display 76 may include incremental percentages (i.e., 10%, 20%, 30%, 40%, 50%, 60%, 70%, etc.) along one or more portions of display bar 210. In these aspects, display 76 and display bar 210 may indicate rated capacity 202 and/or hook load 204 as percentages of total capacity 200. Alternatively or additionally, display 76 may include numeric values along one or more portions of display bar 210. In these aspects, display 76 and display bar 210 may help to indicate numeric values (i.e., in 1,000 lbs. or 10,000 lbs. increments) of total capacity 200, rated capacity 202, and/or hook load 204. Additionally, display bar 210 is shown as being horizontal, but this disclosure is not so limited. Display bar 210 may be vertical, diagonal, or otherwise arranged on display 76. Furthermore, one or more portions of display 76 (i.e., display bar 210) may change colors, emit audible noises, or otherwise change during operation, for example, if hook load 204 approaches rated capacity 202.

Furthermore, display 76 may include one or more other indications. As shown, for example, load display portion 76A of display 76 may include a numeric value of the current rated capacity 222 (i.e., 100,000 lbs.), and may also include a numeric value of the current lifting load or hook load 224 (i.e., 60,000 lbs.). Although not shown, load display portion 76A of display 76 may also include a numeric value of total capacity 200. Additionally, load display portion 76A of display 76 may also include a numeric value of the current pitch 226 (i.e., 5 degrees), a numeric value of current roll 228 (i.e., 5 degrees), and/or a numeric value of the current boom overhang 230 (i.e., 22 feet). Although not shown, load display portion 76A of display 76 may also indicate the position of counterweight 18, for example, from counterweight position 70. In these aspects, information on total capacity 200, rated capacity 202, and hook load 204 may be in close proximity to other information concerning the orientation of pipelayer machine 10 (e.g., machine pitch, machine roll, counterweight position, boom position, etc.). This information may help one or more operators appreciate and/or understand how the orientation of pipelayer machine 10 affects the lifting capacity (i.e., rated capacity 202) of pipelayer machine 10.

INDUSTRIAL APPLICABILITY

The disclosed aspects of the present disclosure may be used in any lifting machine that has the potential to tip based on dynamic loading. For example, the present disclosure may be used by a pipelayer machine to provide an operator, supervisor, or other personnel with real-time lifting capacity information of pipelayer machine 10, including the current load on pipelayer machine 10.

Figure 5:
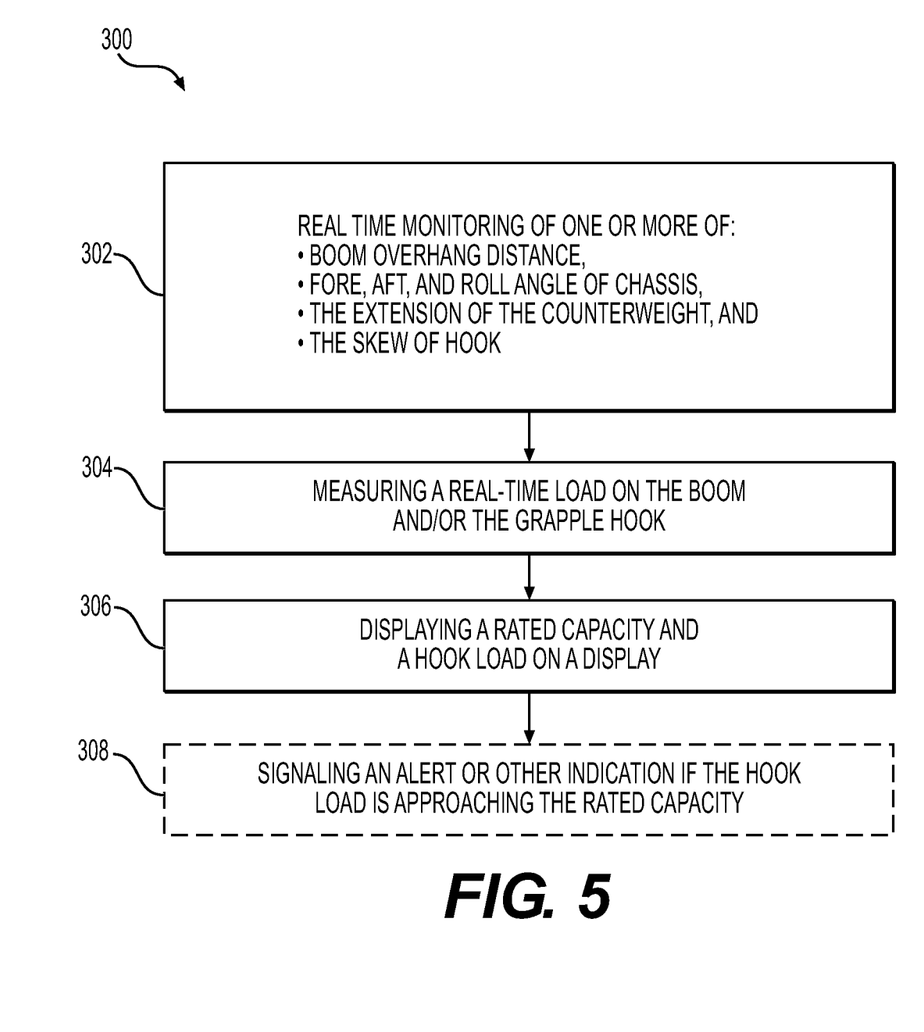
FIG. 5 is a method of operating and/or monitoring the operation of the exemplary lifting machine of FIG. 1.

Referring to FIGS. 3-5, during operation of pipelayer machine 10, control system 60 monitors the lifting capacity of the pipelayer machine 10 based on data from one or more of sensors 64-72 and lift curve 100. Outputs of real-time lifting capacity status (i.e., rated capacity 202 and/or hook load 204) may be provided by controller 62 to indicator 74 and/or display 76. Additionally, in some aspects, controller 62 may initiate one or more actions based on outputs of the real-time lifting capacity status. For example, controller 62 may inhibit or prevent one or more operator commands, for example, controller 62 may inhibit or prevent one or more operator commands that may overload the capacity of pipelayer machine 10 (i.e., above the rated capacity).

Lift curve 100 may be stored in controller 62. Alternatively or additionally, lift curve 100 may be at least partially calculated and/or adjusted by controller 62. Lift curve 100 may include one or more maps, tables, charts, etc. that identify a lifting limit (i.e., rated capacity 202) of pipelayer machine 10 based on various sensed parameters, such as information from one or more of sensors 64-72. As mention above, the lifting limit (i.e., rated capacity 202) may correspond to a safe operating load, for example, a portion or percentage of the identified tipping load (i.e., a load that pipelayer machine 10 may lift safely without a risk of tipping). Lift curve 100 may be compiled or formed based on experimental, empirical, or calculated data and may be based on the physical attributes of pipelayer machine 10. Lift curve 100 may be used to correlate one or more of information from one or more sensors to adjust rated capacity 202, which may then be displayed on display 76 (FIG. 4). For example, lift curve 100 may correlate information of one or more of a boom overhang distance (via boom angle sensor 64), fore, aft, and roll angle or orientation of chassis 12 (via chassis angle sensor 66), the load on the boom 22 (e.g., from pipe 90 via load sensor 68), the extension of counterweight 18 (via counterweight position sensor and the skew or angular position of grapple hook 38 (via hook angle sensor 72).

FIG. 5 provides an exemplary method 300 of operating and/or monitoring the operation of a lifting machine (e.g., pipelayer machine 10), in accordance with the present disclosure. Method 300 includes a step 302 that includes real-time monitoring of information from one or more sensors. For example, step 302 may include real-time monitoring of one or more of sensors 64-72, e.g., a boom overhang distance (via boom angle sensor 64), fore, aft, and roll angle or orientation of chassis 12 (via chassis angle sensor 66), the extension of counterweight 18 (counterweight position sensor 70), and the skew or angular position of grapple hook 38 (via hook angle sensor 72). The monitored information is provided to controller 62, for example, to determine rated capacity 202. The monitored information may be provided to controller 62 throughout an operation of pipelayer machine 10.

Method 300 further includes a step 304 that includes measuring a real-time load on boom 22 and/or grapple hook 38 of machine 10, for example, from pipe 90, to determine hook load 204 on boom 22 and/or grapple hook 38. In this aspect, the load on boom 22 and/or grapple hook 38 to determine hook load 204 may be measured by load sensor 68, for example, coupled to one or more of cables 32.

Additionally, method 300 includes a step 306 that includes displaying rated capacity 202 and hook load 204 on display 76, for example, on load display portion 76A. In some aspects, step 306 may also include displaying total capacity 200 on display 76, for example, on load display portion 76A. As discussed above with respect to FIG. 4, step 306 may include displaying rated capacity 202 and hook load 204 relative to total capacity 200, for example on display bar 210. Moreover, in some aspects, step 306 may include displaying one or more of a numeric value of rated capacity 222, a numeric value of hook load 224, machine pitch 226, machine roll 228, boom overhang 230, counterweight position (not shown), for example, on load display portion 76A in close proximity to display bar 210. This information may help one or more operators appreciate and/or understand how the orientation of pipelayer machine 10 affects the lifting capacity (i.e., rated capacity 202) of pipelayer machine 10.

Moreover, in some aspects, method 300 may include an optional step 308, which includes controller 60 signaling an alert or other indication (e.g., via one or more of indicator 74 or display 76), for example, if hook load 204 is approaching (e.g., within 25%, 20%, 10%, 5%, etc.) of rated capacity 202. That is, one or more of indicator 74 or display 76 may indicate a warning condition to the operator(s) of pipelayer machine 10 if hook load 204 is, for example, 75%, 80%, 90%, 95%, etc. of current rated capacity 202 and/or total capacity 200. In these aspects, indicator 74 and/or display 76 may emit a visual alert (e.g., change color, flash, etc.), emit an audible alert (e.g., beeping, siren, etc.), etc. In one example, indicator 74 and/or one or more portions of display 76 (e.g., third indication 216 corresponding to hook load 204) may be green when hook load 204 is not in the warning condition. Additionally, indicator 74 and/or one or more portions of display 76 (e.g., third indication 216) may transition to yellow when hook load 204 is approaching the warning condition, and may further transition to red and/or flash when hook load 204 is even closer to, approximating, and/or exceeding the warning condition (i.e., current rated capacity 202). Based on one or more of indicator 74 or display 76, the operator(s) of pipelayer machine 10 may take one or more actions to help reduce hook load 204. For example, the operator(s) of pipelayer machine 10 may reduce the overhang of boom 22 (e.g., by reducing boom angles 82, 84), extend counterweight 18, repositioning and/or reorienting pipelayer machine 10, for example, to a flatter ground, reducing the load on grapple hook 38, etc. In these aspects, one or more of indicator 74 or display 76 may help to apprise the operator(s) of the operating conditions of pipelayer machine 10, for example, the current rated capacity 202 relative to the total capacity 200 and/or the current hook load 204 relative to current rated capacity 202 and/or the total capacity 200. As such, operator(s) of pipelayer machine 10 may be able to help to maintain safe operating conditions.

The lifting capacity system and method of the present disclosure may facilitate a more accurate tracking of tipping loads, may facilitate a safe operation of pipelayer machine 10 by helping to avoid tipping, and/or may facilitate a more efficient operation of pipelayer machine by allowing the machine to operate with the awareness of the current rated capacity 202 and/or with current hook load 204 closer to the current rated capacity 202.

It will be apparent to those skilled in the art that various modifications and variations can be made to the disclosed system without departing from the scope of the disclosure. Other embodiments of the system will be apparent to those skilled in the art from consideration of the specification and practice of the lifting capacity system and method disclosed herein. It is intended that the specification and examples be considered as exemplary only, with a true scope of the disclosure being indicated by the following claims and their equivalents.

What is claimed is:

1. A lifting machine, comprising:
a machine chassis;
a boom extending from the machine chassis;
a connector extending from the boom for coupling to a load;
a control system that determines a rated lifting capacity of the machine, based on an orientation of the machine chassis, and a lifting load; and
a display, wherein the display indicates the rated lifting capacity relative to a total lifting capacity on a display bar, and wherein the display indicates the lifting load relative to the rated lifting capacity and the total lifting capacity on the display bar.

2. The lifting machine of claim 1, wherein the display indicates the rated lifting capacity on a sliding scale relative to the total lifting capacity, and wherein the display indicates the lifting load on a sliding scale relative to the total lifting capacity and the rated lifting capacity.

3. The lifting machine of claim 2, wherein the orientation of the machine chassis includes a fore, aft, and roll orientation of the chassis, wherein the rated lifting capacity is further based on a skew of the connector caused by the load, wherein the skew of the connector is a position fore, aft, or roll with respect to a plum line associated with the connector.

4. The lifting machine of claim 3, wherein the rated lifting capacity is further based on a position of a counterweight of the lifting machine.

5. The lifting machine of claim 4, wherein the rated lifting capacity is further based on an overhang of the boom and the load.

6. The lifting machine of claim 1, wherein the display further includes a numeric value of the rated lifting capacity, a numeric value of the lifting load, a numeric value of a current chassis pitch, a numeric value of a current chassis roll, and a numeric value of a current boom overhang.

7. The lifting machine of claim 1, wherein the lifting machine is a pipelayer machine, and wherein the pipelayer machine further includes an indicator configured to indicate one or more warnings if the lifting load approaches the rated lifting capacity.

8. The lifting machine of claim 1, wherein the control system further includes one or more of an IMU sensor, a camera-based sensor, or an angular sensor.

9. A method for determining a lifting capacity of a lifting machine, the lifting machine including a chassis, a boom extending from the chassis, and a connector extending from the boom for coupling to a load, the method comprising:
sensing information including one or more of:
a boom overhang distance; or
an orientation of the chassis;
measuring a real-time load on the boom and/or on the connector; and
displaying a rated lifting capacity and a lifting load on a display, wherein the rated lifting capacity is based on the sensed information, and wherein the lifting load is based on the measured real-time load on the boom and/or on the connector,
wherein displaying the rated lifting capacity and the lifting load on the display includes displaying the lifting load relative to the rated lifting capacity on a common display bar.

10. The method of claim 9, wherein displaying the rated lifting capacity and the lifting load on the display includes: (1) displaying the rated lifting capacity relative to a total lifting capacity on the common display bar, and (2) displaying the lifting load relative to the rated lifting capacity and the total lifting capacity on the common display bar.

11. The method of claim 10, further comprising displaying a numeric value of the rated lifting capacity, a numeric value of the lifting load, a numeric value of a current chassis pitch, a numeric value of a current chassis roll, and a numeric value of a current boom overhang.

12. The method of claim 9, wherein the sensing information further includes sensing a position of a movable counterweight of the lifting machine.

13. The method of claim 9, wherein the sensing information further includes sensing a skew of the connector caused by the load, wherein the skew of the connector includes at least one of a pitch skew or a roll skew, and wherein the measuring includes measuring the real-time load on the connector.

14. The method of claim 13, wherein the skew of the connector is based on a position of the connector with respect to a plum line of the connector.

15. The method of claim 9, wherein the orientation of the chassis includes a fore, aft, and roll orientation of the chassis.

16. The method of claim 15, wherein the lifting machine is a mobile pipelayer machine.

17. A mobile pipelayer machine, comprising:
a machine chassis;
a boom extending from the machine chassis;
a connector extending from the boom for coupling to a load;
a control system that determines a rated lifting capacity of the mobile pipelayer machine and a lifting load, wherein the control system determines the rated lifting capacity based on an a fore, aft, and roll orientation of the machine chassis; and
a display, wherein the display indicates:
the rated lifting capacity relative to a total lifting capacity on a display bar,
the lifting load relative to the rated lifting capacity and the total lifting capacity on the display bar,
a numeric value of a current chassis pitch, and
a numeric value of a current chassis roll.

18. The mobile pipelayer machine of claim 17, wherein the mobile pipelayer machine further comprises a movable counterweight, wherein the rated lifting capacity is further based on a skew of the connector, caused by the load, and a position of the movable counterweight, wherein the skew of the connector is a position fore, aft, or roll with respect to a plum line associated with the connector.

19. The mobile pipelayer machine of claim 17, wherein the rated lifting capacity is further based on an overhang of the boom and the load, and wherein the display is configured to display a numeric value of a current boom overhang.

20. The mobile pipelayer machine of claim 17, wherein the display further includes a numeric value of the rated lifting capacity and a numeric value of the lifting load, and
wherein the mobile pipelayer machine further includes an indicator, wherein the display and/or the indicator are configured to indicate one or more warnings if the lifting load approaches the rated lifting capacity.

* * * * *